R. H. KIRK.
APPARATUS FOR MAKING AND HARVESTING ICE.
APPLICATION FILED SEPT. 14, 1908.
934,544.
Patented Sept. 21, 1909.
3 SHEETS—SHEET 3.
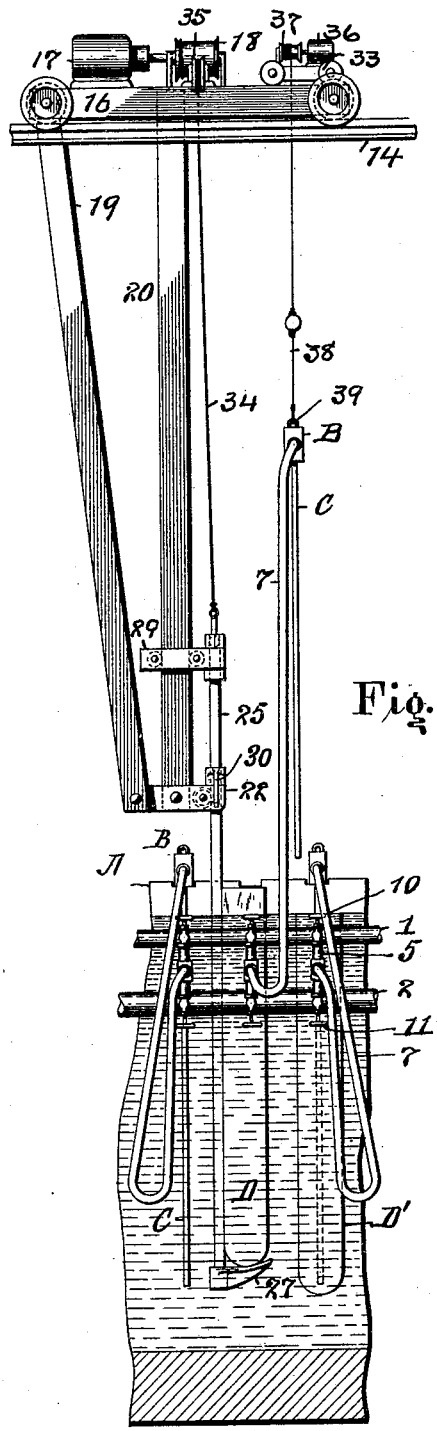
Fig. 3.
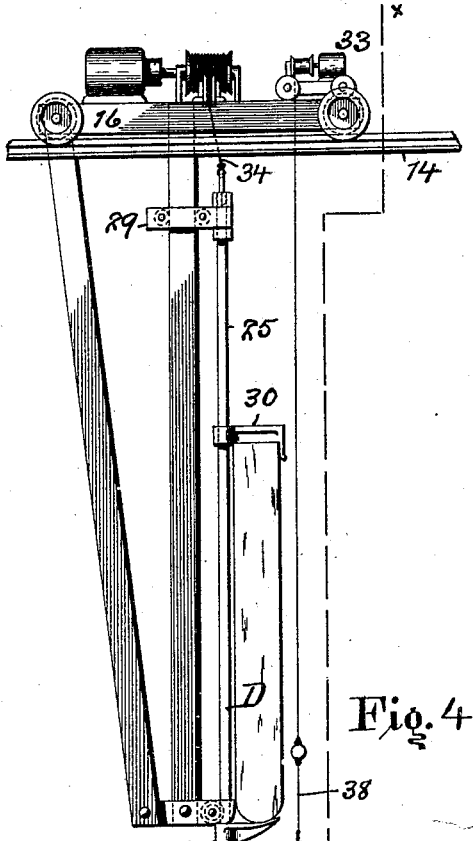
Fig. 4.
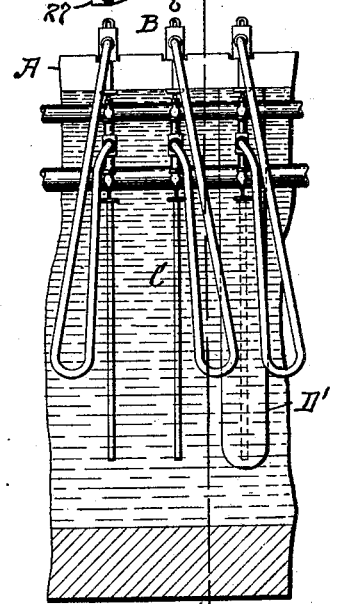

UNITED STATES PATENT OFFICE.

ROBERT H. KIRK, OF BROOKLYN, NEW YORK.

APPARATUS FOR MAKING AND HARVESTING ICE.

934,544.

Specification of Letters Patent. Patented Sept. 21, 1909.

Application filed September 14, 1908. Serial No. 452,909.

*To all whom it may concern:*

Be it known that I, ROBERT H. KIRK, a citizen of the United States, residing at Brooklyn, in the county of Kings and State of New York, have invented a certain new and useful Improvement in Apparatus for Making and Harvesting Ice, of which the following is a specification.

The invention relates to apparatus for making and harvesting plate ice.

The ice cake is first formed upon a removable freezing plate disposed in a tank containing the water to be frozen. Said plate is then thawed off from the cake leaving the cake in the tank free from the plate. The plate and cake are then severally lifted from the tank, and after the plate is lifted out, it may be moved out of the upward path of movement of the cake.

The invention consists in the construction set forth, embodying means for thawing off the cake and lifting out the freezing plate and ice; also means for moving said plate after it is lifted from the tank out of the path of upward movement of the ice cake; also the construction whereby either a fluid refrigerating or thawing off medium may be supplied to the ice plate at will, and without disconnecting said plate from the fixed supply pipes; also the construction of the device for lifting the ice cake from the tank, and also the various combinations more particularly recited in the claims.

Figure 1:
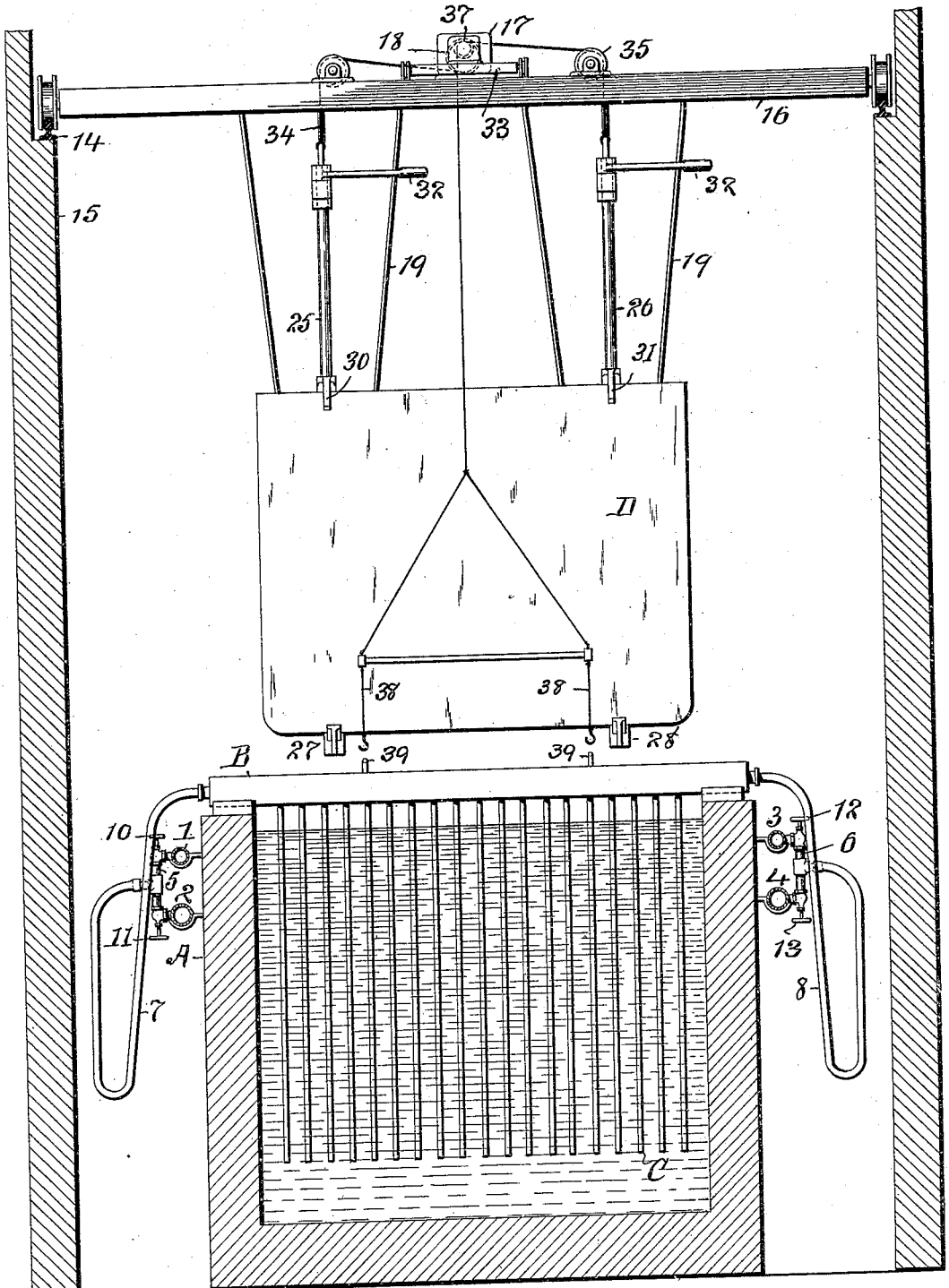
Figure 2:
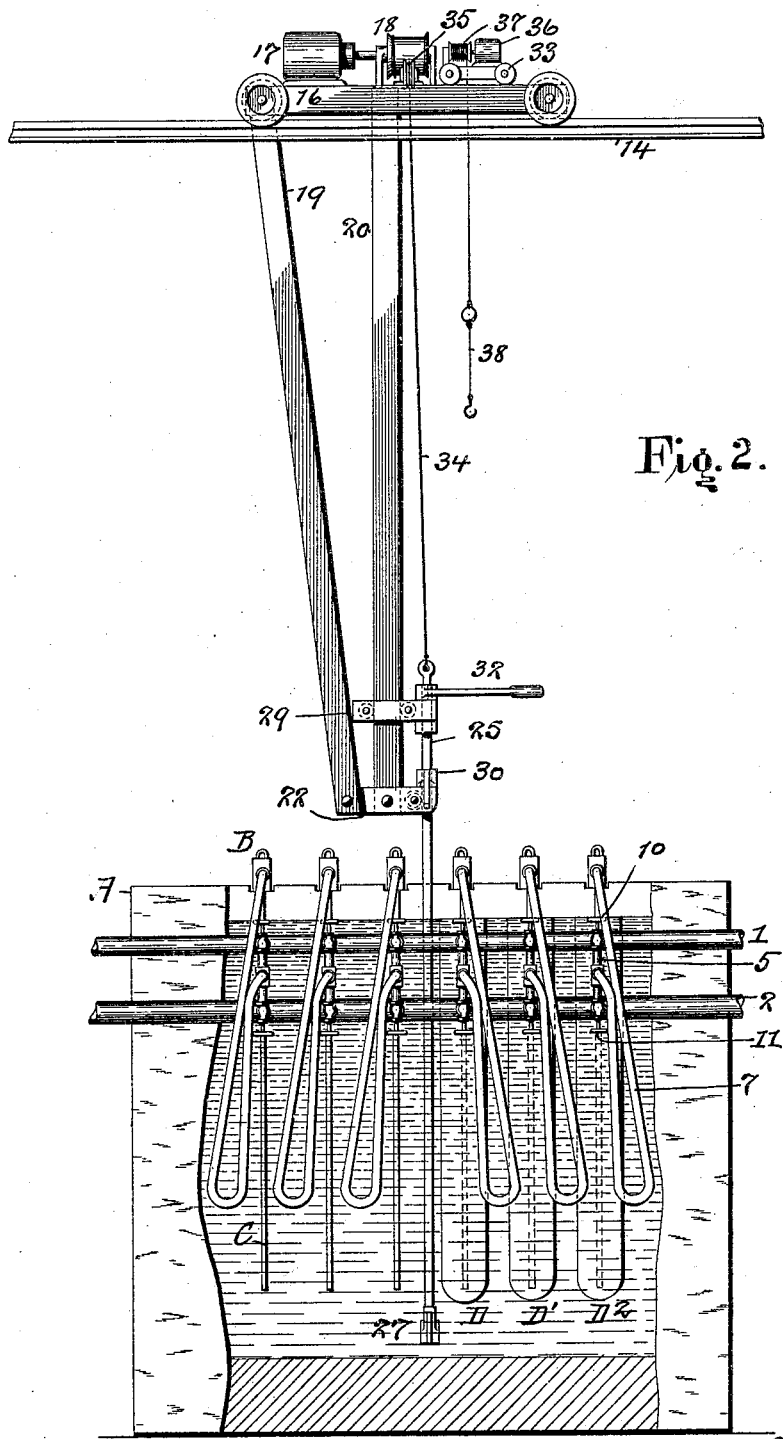

In the accompanying drawings—Figure 1 is a vertical section of the apparatus on the line $x$, $x$, of Fig. 4. Fig. 2 is a side elevation with the wall of the freezing tank broken away, showing the conditions just preceding the harvesting of an ice cake. Fig. 3 is a similar view, the side portions of the tank being also broken away, showing the conditions immediately following the raising of the freezing plate from the ice cake after thawing off. Fig. 4 is a view similar to Fig. 3, showing the harvested ice cake in the lifting device and the freezing plate, on which said cake was formed, replaced in the tank.

Similar numbers and letters of reference indicate like parts.

The plate ice making apparatus here shown is in general construction and principle similar to that set forth in U. S. Reissued Letters Patent No. 12,808, granted to D. J. Havenstrite June 9, 1908. A is the tank containing the water to be frozen and receiving the freezing plates which comprise headers B and parallel tubes C, depending therefrom. The internal construction of headers and tubes may be substantially as shown in said Havenstrite patent, so as to provide for circulation of liquid refrigerant or thawing off medium therein. During the freezing operation, cakes D, D′, D², free from the sides and bottom of the tank A, form on the freezing plates. In said Havenstrite apparatus, the headers are detachably connected to the pipes which supply liquid refrigerant, so that after an ice cake is formed, said pipes are disconnected to permit each freezing plate, together with the ice cake adherent thereto, to be lifted from the tank, after which the cake is freed from the plate by circulation of warm liquid in the tubes.

In my present apparatus, the inlet and outlet pipes for refrigerating fluid or thawing off medium remain permanently connected by flexible pipes to the opposite ends of the header, and said flexible pipes are made long enough to permit the freezing plate to be hoisted up clear of the tank after being thawed from the ice cake. The ice cake, therefore, is not removed from the tank while adherent to the freezing plate, but is taken out after the freezing plate has first been removed from it.

1 and 3 are pipes supported on brackets on the sides of the tank and connected with any suitable source of fluid refrigerant. 2 and 4 are similarly supported pipes connected with any suitable source of warm liquid. The pipes 1 and 2 are connected by pipes 5. The pipes 3 and 4 are connected by pipes 6. At their middle portions, pipes 5 and 6 are connected by flexible pipes 7, 8, to opposite ends of the headers. In each pipe 5, between the point of junction of flexible pipe 7 therewith and the pipes 1 and 2, are valves 10, 11. In each pipe 6, between the point of junction of flexible pipe 8 therewith and the pipes 3 and 4, are valves 12, 13. When valves 11 and 13 are closed and valves 10 and 12 opened, fluid refrigerant will enter the header from pipe 1 and flexible pipe 7, circulate through header and tubes and escape by pipe 3 and flexible pipe 8. When valves 11 and 13 are opened and valves 10 and 12 closed, warm liquid will enter the header from pipe 2 and flexible pipe 7, circulate through header and tubes and escape by pipe 4 and flexible pipe 8. Hence, any given freezing plate being in position in the tank, I can, by the aforesaid means, circulate fluid refrigerant through the same until the ice cake D is formed, and then I can cut off the flow of refrigerant and admit warm liquid into the plate to thaw the tubes from the cake.

Running on tracks 14, above the tank A and supported on the walls 15 of the building, is a traveling crane, on the carriage 16 of which is mounted an electric motor 17 which rotates a winding drum 18. Depending from said carriage are two hangers 19, having vertical members 20. On the lower ends of said hangers are fixed guides 22, each guide having a vertical opening and a roller in said opening. Through the openings in guides 22, and bearing against the rollers therein, extend cylindrical lifting rods 25, 26, which carry at their lower ends, hooks 27, 28. Secured on the rods 25, 26 are guide blocks 29 which slide on the vertical members 20 of the hangers 19, and are provided with rollers bearing on opposite edges of said member. Loose on the lifting rods 25, 26 are sleeves carrying downwardly turned hooks 30, 31, and fast on said rods above the guide blocks 29 are levers 32 by which said rods can be turned in the guides 29 and 22. On the upper end of the rods 25, 26 are eyes to which are fastened the ends of the hoisting rope 34, said rope being taken to the winding drum 18 after passing over pulleys 35 on carriage 16. Mounted on the carriage 16, is a second carriage 33 carrying an electric motor 36, and hoisting drum 37 actuated by said motor, the rope from said drum being connected to the ends of a spreader bar from which depend the two cords 38, each having a hook at the end for engagement with eyes 39 on the upper side of each header B.

The operation is as follows: The freezing plates are inserted in the tank A, the headers B resting on the tank walls. In Fig. 2, it may be considered that the three plates on the left have just been placed in the tank, so that no ice has yet formed on them, whereas the three plates on the right have been in operation sufficiently long for the formation of the ice cakes D, D', D². I will now follow the removal of the cake D. The carriage 16 being moved into position, the lifting rods 25, 26 are rotated by their handles 32, so that the lower hooks 27, 28 stand parallel to the face of the ice cake, the object here being to permit the hooks to be introduced in the space between the cake on the adjacent plate. When the lifting rods are fully down, the hooks 27, 28 come below the lower edge of the cake D, as shown in Fig. 4. The small carriage 33 is now moved on carriage 16 so as to stand directly over the cake D, and so that when the hoisting rope is overhauled down, its hooks may be engaged with the header eyes 39. The valves 10 and 12 are now shut and the valves 11 and 13 opened, so that warm liquid circulates from pipe 2 through the freezing plate and so to pipe 13. In this way, the tubes C are thawed from the cake. Meanwhile the lifting rods are turned so as to bring the hooks 27, 28 in position to engage with the cake D, and the cake is raised, by operating the motor 17, sufficiently to cause its weight to be taken by said hooks, as shown in Fig. 3. As soon as the thawing off of tubes C is completed, the motor 36 on carriage 33 is set in operation and the plate is lifted clear of the tank. Then the carriage 33 is moved on carriage 16 to carry the plate from directly above the ice cake D, the several parts taking the positions shown in Fig. 3. The motor 17 on carriage 16 is now set in operation to further raise the cake D by means of the lifting rods. Said rods move through the guides 22, 23 and also the sleeves of hooks 30, 31, until the upper edge of the ice cake meets the hooks 30, 31, which then engage the cake as shown in Fig. 4, so that the cake becomes supported by the hooks 30, 31 and 27, 28, and hence, at both its upper and lower edges, and is so held in vertical position. The carriage 16 is now operated to transport the freezing plate suspended from the drum of carriage 33 into position to be again inserted in the tank. The warm liquid supply is cut off from the plate and the refrigerating fluid supply established. Said plate is then lowered into its original place in the tank and its hoisting rope is disconnected. The carriage 16 is then further moved to transport the ice cake to the annealing chamber or to the cutting saws, or to any other place or device to which it may be desired to carry it. After the cake is released from the lifting rods, the carriage 16 is brought back to its original position and the same operation is gone through in order to harvest the next cake D'. It will be noted, therefore, that as fast as each cake is formed, the freezing plate is thawed clear of it, the cake is then removed from the tank and the freezing plate immediately put back in the tank, and that this operation may go on continuously and indefinitely.

I claim:

1. The combination with a tank, a freezing plate and means for thawing off the ice cake formed on said plate, of means for lifting said freezing plate from said tank, and independently operable means for lifting said ice cake from said tank.

2. The combination with a tank, a freezing plate and means for thawing off the ice cake formed on said plate, of means for lifting said plate from said tank and for retaining said plate in suspension, means for lifting said ice cake from said tank, and means for moving said suspended plate out of the path of upward movement of said ice cake.

3. In combination with a tank and a removable freezing plate, fixed pipes for conveying refrigerating medium to and from said plate, fixed pipes for conveying a thawing off medium to and from said plate, a tube of flexible material connecting said first named pipes to one end of said plate, a tube of flexible material connecting said last named pipes to the other end of said plate, and means for permitting either of said media to circulate through said flexible tubes and plate.

4. In combination with a tank, a removable freezing plate, two induction pipes respectively for refrigerating and thawing off media located on one side of said tank, two eduction pipes respectively for said media located on the opposite side of said tank, a flexible connection between said induction pipes and one end of said plate, a flexible connection between said eduction pipes and the other end of said plate, and means for permitting either said refrigerating medium or said thawing off medium to circulate through said flexible connections and said plate.

5. In combination with a tank, a removable freezing plate, two induction pipes respectively for refrigerating and thawing off media located on one side of said tank, two eduction pipes respectively for said media located on the opposite side of said tank, a flexible connection between said induction pipes and one end of said plate, a flexible connection between said eduction pipes and the other end of said plate, and means for hoisting and suspending said plate: the said flexible connections being of sufficient length to permit said plate to be raised and suspended clear of said tank.

6. In combination with a tank, a freezing plate, stationary induction pipes for refrigerating and thawing off media, a pipe connecting said induction pipes, stationary eduction pipes for said media, a pipe connecting said eduction pipes, flexible tubes through which said connecting pipes communicate respectively with opposite ends of said freezing plate, and valves in said connecting pipes; whereby either said refrigerating medium or said thawing off medium may be permitted to circulate through said flexible connecting tubes and said plate.

7. The combination with a tank, a freezing plate, and means for thawing off the ice cake formed on said plate, of a support above said tank, a carriage movable on said support in a direction at right angles to said plate, hoisting mechanism on said carriage for lifting said cake from said tank, a second carriage movable on said first carriage, and hoisting mechanism on said second carriage for lifting said plate from said tank.

In testimony whereof I have affixed my signature in presence of two witnesses.

ROBERT H. KIRK.

Witnesses:
GERTRUDE T. PORTER,
MAY T. McGARRY.